(12) United States Patent
Oguma

(10) Patent No.: US 7,389,032 B2
(45) Date of Patent: Jun. 17, 2008

(54) METHOD AND APPARATUS FOR ADJUSTING LOSS CAUSED BY OPTICAL FIBER CURVATURE, AND OPTICAL TRANSMISSION SYSTEM USING THE SAME

(75) Inventor: Takefumi Oguma, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 11/567,387

(22) Filed: Dec. 6, 2006

(65) Prior Publication Data
US 2007/0189697 A1   Aug. 16, 2007

(30) Foreign Application Priority Data
Dec. 6, 2005 (JP) .............................. 2005-351467

(51) Int. Cl.
G02B 6/00 (2006.01)
(52) U.S. Cl. ............ 385/136; 385/135; 385/140; 385/15; 385/39; 385/137
(58) Field of Classification Search ................ 385/140, 385/136; 350/96.23
See application file for complete search history.

(56) References Cited

U.S. PATENT DOCUMENTS 4,721,351 A * 1/1988 Goepfert et al. ............. 385/32
4,852,964 A * 8/1989 Holland et al. ............. 385/111
6,456,775 B1 * 9/2002 Johnson et al. ............. 385/140

FOREIGN PATENT DOCUMENTS

JP      2001-228337      8/2001
JP      2001228337    *  8/2001

* cited by examiner

Primary Examiner—Brian Healy
Assistant Examiner—Guy G Anderson
(74) Attorney, Agent, or Firm—Ostrolenk, Faber, Gerb & Soffen, LLP (57) ABSTRACT

The present invention achieves highly reliable optical-fiber loss adjustment at low cost, with easy work. An optical fiber is inserted from an optical fiber insertion opening into a space between an internal wall and a plurality of optical-fiber support members and, due to its self-resilience, comes in contact with the support members on its outer side. Since the radius of curvature of the fiber is sufficiently small, a loss can be adjusted with the number of turns of the fiber. The support members have a cylindrical shape and therefore come in point contact with the fiber, which can prevent microbending. Moreover, the interval (angle) between adjacent ones of the support members and the radius thereof are set such that the fiber can be led into and out of an optical-fiber adjustor, with no stress imposed.

16 Claims, 4 Drawing Sheets

LOSS : AdB    LOSS : BdB/TURN    LOSS : 0dB/TURN

FIG. 5

31 OPTICAL-FIBER SUPPORT MEMBER 34-1～34-3 : INSULATOR

METHOD AND APPARATUS FOR ADJUSTING LOSS CAUSED BY OPTICAL FIBER CURVATURE, AND OPTICAL TRANSMISSION SYSTEM USING THE SAME

BACKGROUND OF THE INVENTION

1. Field of the Invention

The present invention relates to techniques for adjusting the loss or attenuation caused by the curvature of an optical fiber and, more particularly, to a method and an apparatus for adjusting an intensity loss of an optical signal transmitted through the optical fiber, as well as to an optical transmission system using the same.

2. Description of the Related Art

In a multiple-relay wavelength division multiplexing transmission system, a large number of optical multiplexers/demultiplexers, optical amplifiers and the like are used. These optical devices are constituted in such a manner that two or more optical components are connected by fiber fusion splicing. To prevent variations in loss among multiple principal signals, adopted is loss increase splicing, which intentionally gives a loss.

To accomplish this intentional increase of a loss, generally employed is a method by which the cores of spliced fibers are intentionally misaligned when fusion splicing is performed. However, although this loss increase splicing ensures the quality of transmission on one hand, an expensive optical fiber fusion splicer is needed, as well as many hours of work required, to splice fibers with their cores misaligned, on the other hand. Therefore, there are problems such as increased manufacturing costs and lead times.

For another method, Japanese Patent Application Unexamined Publication No. 2001-228337 discloses an optical attenuator which utilizes the phenomenon that the amount of loss in an optical fiber depends on the curvature radius of the optical fiber. This optical attenuator includes: a main body composed of a base with a plurality of projections thereon; and an optical fiber placed on a face of the base, bent in a predetermined circular shape by being brought in contact with the projections. According to an optical-fiber loss adjusting method employed in this optical attenuator, a coarse adjustment is first made in which the amount of optical attenuation per turn of the optical fiber is large with a reduced radius of curvature of the optical fiber, and thereafter, a fine adjustment is made in which the amount of optical attenuation per turn of the optical fiber is reduced by increasing the curvature radius of the optical fiber. In this manner, the level of an optical signal, or the amount of optical attenuation, is adjusted by setting two curvature radii or more, without changing the number of turns of the optical fiber.

However, the optical attenuator employing this conventional method has such a structure that the optical fiber is placed on the face of the seat while being wound round to make double circles, one with a lager radius of curvature and the other with a smaller radius of curvature, the shapes of which are maintained by a support member. Accordingly, there are possibilities of the occurrence of an unexpected loss (microbend) and the loosening of the optical fiber, depending on the shape of the support member where the circle with the larger radius of curvature is connected to the circle with the smaller radius of curvature.

SUMMARY OF THE INVENTION

An object of the present invention is to provide a method and an apparatus for adjusting the loss due to curvature of an optical fiber, which can adjust an intensity loss of an optical signal transmitted through an optical fiber, at low cost and with easy work, as well as to provide an optical transmission system using the method and apparatus.

Another object of the present invention is to provide a method and an apparatus for adjusting the loss due to curvature of an optical fiber, which can prevent the occurrence of a microbend and allows an optical fiber inlet/outlet position to be arbitrarily set, as well as to provide an optical transmission system using the method and apparatus.

According to a first aspect of the present invention, an intensity level of an optical signal is adjusted by winding a number of turns of the optical fiber along a space between a cylindrical interior wall and a plurality of cylindrical optical-fiber support members which are concentrically disposed, wherein each of the cylindrical optical-fiber support members has a diameter smaller than that of the cylindrical interior wall, wherein the number of turns corresponds to a desired amount of adjustment. Since the optical fiber is wound along the space between the cylindrical interior wall and the cylindrical optical-fiber support members, the optical fiber is brought in point contact with each of the optical-fiber support members. Accordingly, the occurrence of a microbend can be prevented. Moreover, since the optical fiber can be led in/out between any adjacent ones of the optical-fiber support members, the inlet and outlet positions can be easily set.

According to a second aspect of the present invention, the following steps are repeated for each of a plurality of optical fibers: on a lower support, winding a first number of turns of a first optical fiber along a space between the cylindrical interior wall and the plurality of cylindrical optical-fiber support members, wherein the first number of turns corresponds to a first amount of adjustment; and disposing on the first optical fiber a first insulator which is perforated with penetrating holes through which the cylindrical interior wall and the plurality of cylindrical optical-fiber support members each are passed. Accordingly, a plurality of optical fibers are stacked on the lower support with insulators inserted between them, which can perform concurrent loss adjustment of the plurality of optical fibers.

Preferably, a radius of each of the plurality of cylindrical optical-fiber support members is set within a range satisfying the following inequality:

$$R2(1+\cos\theta) - d < R1(1-\cos\theta)$$

where R1 is a radius of a maximum turn of the optical fiber wound between the cylindrical interior wall and the plurality of cylindrical optical-fiber support members, R2 (<R1) is the radius of each of the plurality of cylindrical optical-fiber support members, and θ is an arrangement interval (angle) between adjacent ones of the plurality of cylindrical optical-fiber support members. By satisfying the above inequality, the optical fiber can be led in/out between any adjacent ones of the optical-fiber support members with no stress imposed.

According to a third aspect of the present invention, the following steps are performed: winding an optical fiber on an extra fiber length management section for extra fiber length management; passing the optical fiber from the extra fiber length management section to a loss adjustment section to wind a number of turns of the optical fiber between a cylindrical interior wall and a plurality of cylindrical optical-fiber support members which are concentrically disposed, wherein each of the cylindrical optical-fiber support members has a diameter smaller than that of the cylindrical interior wall, wherein the number of turns corresponds to a desired amount of adjustment; and passing the optical fiber from the loss adjustment section to the extra fiber length management section to perform extra fiber length management. Accordingly, both the optical loss adjustment and the extra fiber length management can be performed by a single device. In other words, the extra fiber length management section, the cylindrical interior wall, the plurality of cylindrical optical-fiber support members, and the fiber guide section for guiding the optical fiber to the space between the cylindrical interior wall and the plurality of cylindrical optical-fiber support members are integrally structured.

According to a fourth aspect of the present invention, an optical transmission system having an input connector and an output connector, includes: at lease one optical device provided on an optical fiber through which an optical signal is transmitted from the input connector to the output connector; an optical loss adjustment bobbin provided on an optical fiber, wherein the above loss adjustment section is used as the optical loss adjustment bobbin. Further, an optical-fiber insertion opening through which the optical fiber is allowed to be inserted may be provided by setting a length of the cylindrical interior wall larger than that of the cylindrical optical-fiber support members and fixing a upper support shaped like a disk on the top of the cylindrical interior wall. In addition, a plurality of optical fibers may be stacked on the lower support with insulators inserted between them, which can perform concurrent loss adjustment of the plurality of optical fibers.

As another embodiment, an optical transmission system having an input connector and an output connector, may include: at lease one optical device provided on an optical fiber through which an optical signal is transmitted from the input connector to the output connector; an extra fiber length management section, an optical loss adjustment bobbin provided on an optical fiber, wherein the optical fiber is passed from the extra fiber length management section to the loss adjustment section to wind a number of turns of the optical fiber, wherein the optical fiber is passed from the loss adjustment section to the extra fiber length management section to perform extra fiber length management. Accordingly, the extra fiber length management section, the cylindrical interior wall, the plurality of cylindrical optical-fiber support members, and the fiber guide section for guiding the optical fiber to the space between the cylindrical interior wall and the plurality of cylindrical optical-fiber support members are integrally structured, whereby loss adjustment can be performed without making a change in a conventional footprint.

The above-mentioned optical-fiber loss adjustor may include: a cylindrical inner support member provided on a lower support; and a plurality of outer support members which are concentrically disposed around the cylindrical inner support member on the lower support. The intensity level of an optical signal is adjusted by winding the optical fiber between the cylindrical inner support member and an innermost circle of the outer support members.

As described above, according to the present invention, an optical fiber is wound along the space between the cylindrical interior wall and the plurality of cylindrical optical-fiber support members, whereby the optical fiber is brought in point contact with the optical-fiber support members. Accordingly, the occurrence of a microbend can be prevented. Moreover, since the optical fiber can be led in/out between any adjacent ones of the optical-fiber support members with no stress imposed, the inlet and outlet positions can be easily set. Accordingly, a fine adjustment of an optical loss is possible.

Further, according to the present invention, at least one insulator is provided above the lower support, whereby loss adjustments can be simultaneously made for a plurality of different optical fibers, respectively. Therefore, if this is applied to an optical multiplexer/demultiplexer for wavelength division multiplexing transmission, the efficiency of installation can be improved. In addition, since the forms of the optical fibers are completely fixed, a structure suitable for mass production can be achieved.

Furthermore, according to the present invention, a first bobbin for optical loss adjustment and a second bobbin for extra fiber length management are integrally structured, whereby loss adjustment can be performed without making a change in a conventional footprint. In addition, since no expensive fusion splicer is needed, a cost reduction is possible.

Still furthermore, according to the present invention, since the method of increasing a loss is merely to wind an optical fiber around a cylindrical column, the work can be easily done even if a user has no know-how about fiber fusion splicing. In addition, when a readjustment is required, the amount of loss can be adjusted by increasing the number, or angle, of turns of the optical fiber wound round between the interior wall and the optical-fiber support members.

DETAILED DESCRIPTION OF THE PREFERRED EMBODIMENTS

1. First Embodiment

Figure 1A:
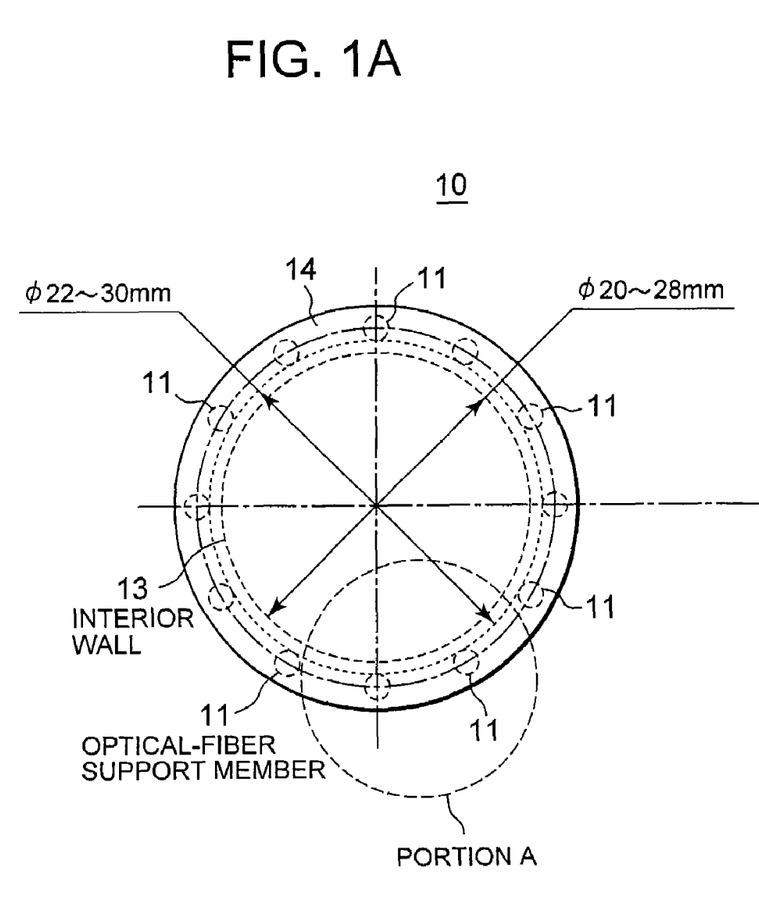
FIG. 1A is a plane view of an optical-fiber loss adjustor according to a first embodiment of the present invention.
Figure 1B:
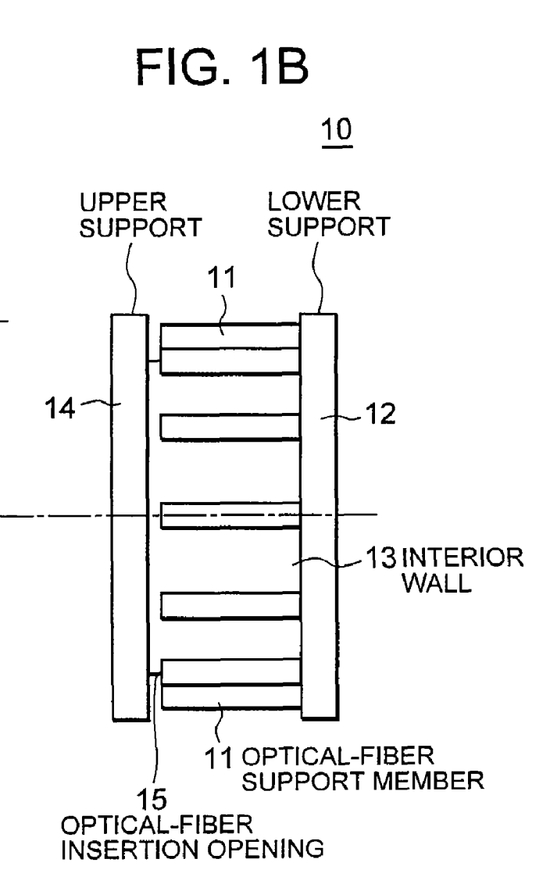
FIG. 1B is a side view of the optical fiber loss adjustor according to the first embodiment of the present invention.

Referring to FIGS. 1A and 1B, in an optical-fiber loss adjustor 10, a plurality of cylindrical optical-fiber support members 11 are fixed onto a disk-shaped lower support 12, arranged in a circle on the outside of (around) a cylindrical interior wall 13 with a diameter of, for example, 20 to 28 mm. The optical-fiber support members 11 are arranged in a circle which a radius set in the range of 10 to 15 mm. Moreover, the height of the interior wall 13 is set larger than that of the optical-fiber support members 11 by an amount allowing an optical fiber to pass through an optical-fiber insertion opening 15 in FIG. 1B. A disk-shaped upper support 14 is placed and fixed onto the top of the interior wall 13. The upper support 14, interior wall 13 and optical-fiber support members 11 are concentrically disposed.

Figure 2:
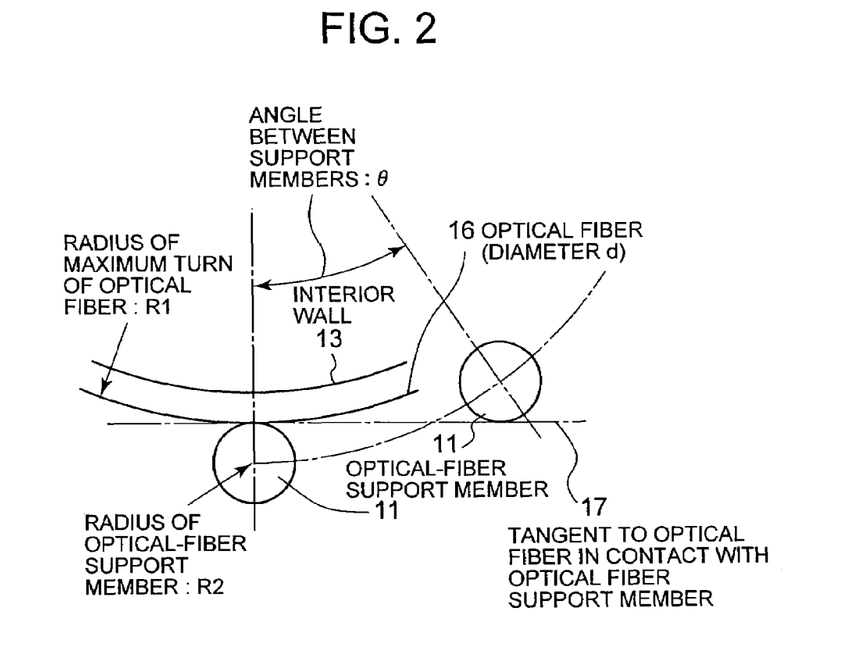
FIG. 2 is an enlarged view of a portion A of the optical-fiber loss adjustor shown in FIG. 1A.

Referring to FIG. 2, an optical fiber 16 with a diameter d is present between the interior wall 13 and the optical-fiber support members 11. A tangent to the optical fiber 16 in contact with an optical-fiber support member 11 is shown at numeral 17. If R1 is the radius of a maximum turn of the optical fiber 16 (the radius of a circle inscribed in the optical-fiber support members 11), R2 is the radius of each of the optical-fiber support members 11, and θ is the arrangement interval (angle) between adjacent ones of the optical-fiber support members 11, then the radius R2 of each of the optical-fiber support members 11 is set within the range satisfying the following inequality:

$$R2(1+\cos\theta)-d<R1(1-\cos\theta) \quad (1)$$

where 11 mm ≦ R1 ≦ 15 mm.

Here, assuming that θ=45°, R1=11 mm, and d=0.25 mm, then R2<2.03 mm from the inequality (1). In the case of the above conditions, there is no problem if each of the optical-fiber support members 11 is designed to have a radius R2 of 2 mm or smaller, as described below.

When a loss is adjusted by using the optical-fiber loss adjustor according to the present embodiment, an adjustment is made in such a manner that the optical fiber 16 is inserted from the optical-fiber insertion opening 15 in FIG. 1B, is passed through a gap between adjacent ones of the optical-fiber support members 11, and is wound around the interior wall 13 a required number of times. However, if the gap is narrow, or if the diameter d of the optical fiber 16 is large, the optical fiber 16 is bent to an extreme at an inlet/outlet portion in the optical-fiber loss adjustor 10, with a microbend and the like occurring, which are undesirable in a proper loss adjustment, resulting in greatly degraded optical characteristics and reliability.

To prevent this, it suffices that the interval (angle) θ between adjacent ones of the optical-fiber support members 11 and the radius R2 thereof are set such that the tangent 17 to the inscribed circle of the optical-fiber support members 11 (maximum path of the optical fiber 16), at the contact point with one of the optical-fiber support members 11, will not traverse the cross section of the adjacent one of the optical-fiber support members 11, as shown in FIG. 2. The condition satisfying this setting is the above-mentioned inequality (1).

Moreover, if an optical fiber is in line or plane contact with a surface, the optical fiber will follow projections and depressions on the surface, resulting in a microbend occurring. According to the present embodiment, however, each of the optical-fiber support members 11 has a cylindrical shape and therefore come in point contact with the optical fiber. Accordingly, the occurrence of a microbend can be prevented. Furthermore, since the interval (angle) θ between adjacent ones of the optical-fiber support members 11 and the radius R2 thereof satisfy the above-mentioned inequality (1), the optical fiber can be led in and out of the optical-fiber loss adjustor 10, with no stress imposed. That is, the optical fiber can be led in and out from any position on the circumference of a circle formed by the optical-fiber support members 11, and accordingly it is possible to make a fine adjustment of a loss (for example, by winding 1.5 turns, 1.8 turns, or the like).

The optical fiber 16 is inserted from the optical fiber insertion opening 15 in FIG. 1B into a space between the interior wall 13 and the optical-fiber support members 11 and, due to its self-resilience, comes in contact with the optical-fiber support members 11 on its outer side. This makes the radius of curvature of the optical fiber 16 sufficiently small. Accordingly, the loss or the intensity level of a transmitted optical signal can be adjusted with the number of turns (angle of turn) of the optical fiber 16.

Figure 3:
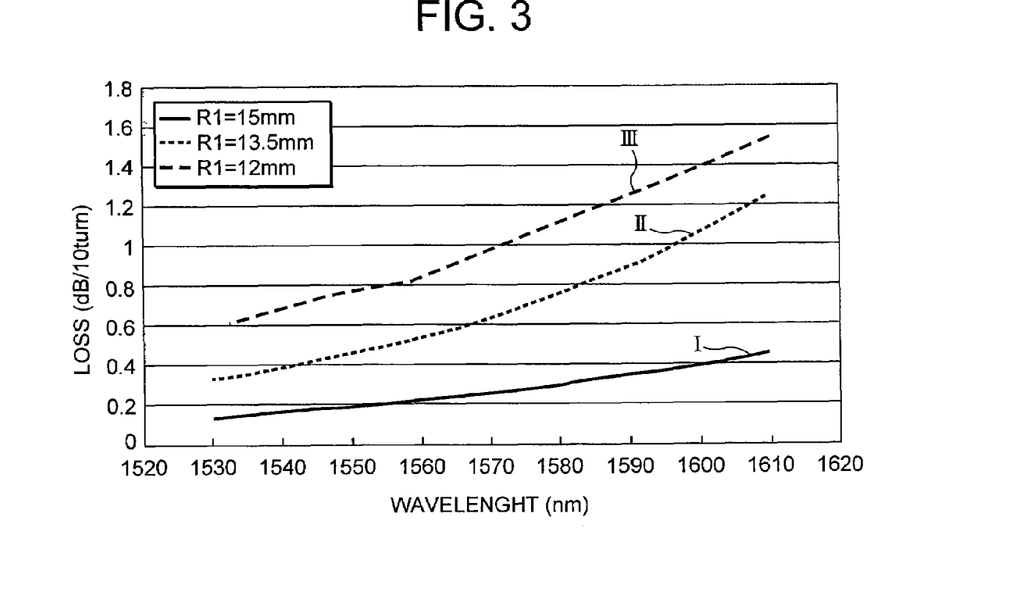
FIG. 3 is a graph showing the results of the measurement of a loss per 10 turns when R1=15 mm, 13.5 mm and 12 mm, at each wavelength, using a single-mode fiber with a diameter of 250 µm.

FIG. 3 shows the results of the measurement of a loss per 10 turns (equivalent to 3600 degrees on an angle basis) when R1=15 mm, 13.5 mm and 12 mm, at each wavelength, using a single-mode fiber with a diameter of d=250 μm. Specifically, in FIG. 3, a curve I shows the result of the measurement when the radius R1 of the inscribed circle of the optical-fiber support members 11 is 15 mm, a curve II shows the result of the measurement when R1 is 13.5 mm, and a curve III shows the result of the measurement when R1 is 12 mm.

Conventionally, when adjusting a loss, it was necessary to perform fiber fusion splicing by using an expensive optical fiber fusion splicer having a loss increase splicing function. However, according to the present embodiment, merely routing an optical fiber between the cylindrical interior wall 13 and the optical-fiber support members 11 will suffice, without the need for an expensive fusion splicer. Consequently, a cost reduction is possible. Note that the loss increase splicing mentioned here means a splicing method that intentionally gives a loss of about a few dB by misaligning the cores of optical fibers to be spliced together.

Moreover, according to the present embodiment, ease of work is notable. The method for increasing a loss is merely to route the optical fiber between the cylindrical interior wall 13 and the optical-fiber support members 11 (i.e., to wind the optical fiber around the cylindrical column). Therefore, the work can be done even if a user has no know-how about optical fiber fusion splicing. In addition, when a readjustment is required, the amount of loss can be adjusted by increasing the number, or angle, of turns of the optical fiber wound around the bobbin for loss adjustment. Further, according to the present embodiment, as shown in FIGS. 1A and 2, since the cylindrical interior wall 13 is provided, the work of winding the optical fiber is facilitated, and additionally the radius of a minimum turn can be maintained during operation. Furthermore, according to the present embodiment, since the lower and upper supports 12 and 14 are provided, the form of the optical fiber can be stabilized during operation.

Figure 4:
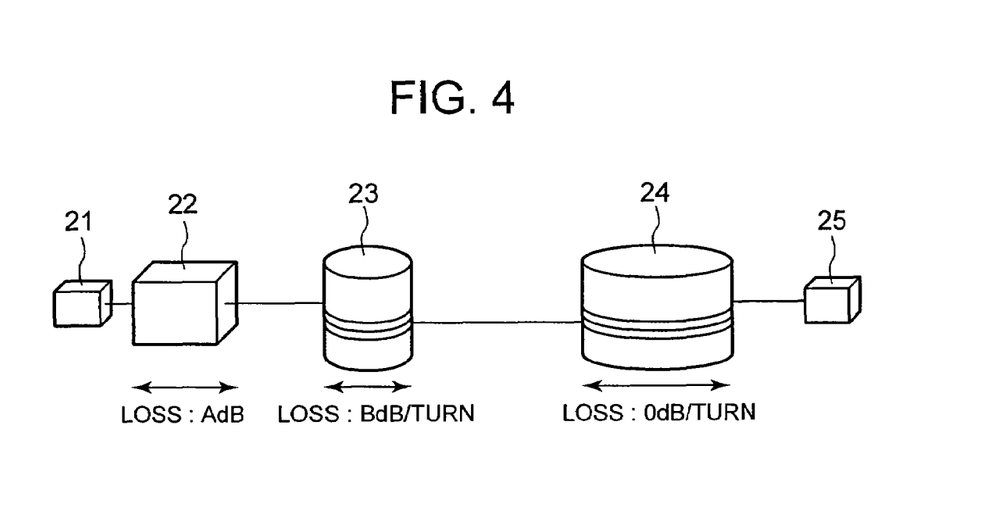
FIG. 4 is a schematic diagram showing an example of an optical transmission system to which the present invention is applied.

Next, an optical transmission system using the above-described optical-fiber loss adjustor will be described. FIG. 4 shows a schematic diagram of an embodiment of the optical transmission system, which is an aspect of the present invention. This embodiment is characterized in that the optical-fiber loss adjustor shown in FIGS. 1A to 2 is employed as a bobbin 23 for optical loss adjustment.

Referring to FIG. 4, an input connector 21 is connected to an output connector 25 by an optical fiber via an optical component 22 providing a loss of A [dB], the loss adjustment bobbin 23 for a small radius of curvature, which is the optical-fiber loss adjustor according to the present invention, and a bobbin 24 for extra fiber length management for a large radius of curvature, in this order. According to this, an optical signal inputted into the input connector 21 is attenuated by A [dB] by the optical component 22 and then led into the loss adjustment bobbin 23. For the small radius of curvature, the optical signal is assumed to be attenuated by B [dB] per turn (B dB/angle of turn of 360°) due to a bending loss when the optical fiber is wound around this bobbin 23.

Accordingly, at the output end of the loss adjustment bobbin 23, the optical signal has been further attenuated by multiplying B by the number of turns around the bobbin 23 which is obtained by dividing the angle of turn around the bobbin 23 by 360°. When the optical fiber is wound around the bobbin 24, a loss of the optical signal is substantially 0 [dB] because the extra fiber length management bobbin 24 provides a sufficiently large radius of curvature. Accordingly, the optical signal is outputted to the output connector 25 as it is.

In this event, the total loss of the optical signal made between the input connector 21 and the output connector 25 is A+B* (the number of turns around the bobbin 23) [dB]. Therefore, the amount of attenuation (loss) can be arbitrarily adjusted by changing the angle of turn of the optical fiber around the loss adjustment bobbin 23.

Here, there is a close relationship between the radius of curvature of a single-mode fiber and the bending loss. In general, when the radius of curvature is 20 mm or greater, the bending loss can be considered to be substantially 0 [dB]. Single-mode fiber has the characteristic that the bending loss increases as the radius of curvature becomes smaller than 20 mm (see FIG. 6 in a web page at <http:times.ansl.nt-t.co.jp/gijyutu/2000_06/topic_05/topic05_06.html>). Moreover, a single-mode fiber tolerating as small a radius of curvature as 4 mm is already commercially available (for example, single-mode fiber SM332-PF made by Furukawa Electric Co., Ltd.; see <http://www.furukawa.co.jp/fiber/jp/products/dpf/sm332-pf.pdf>). Therefore, in the case of such a single-mode fiber, there is no problem about reliability if the radius of curvature is 4 mm or greater.

On the other hand, in the case of an ordinary single-mode fiber, as the radius of curvature becomes smaller, a microbending loss due to the unevenness of the cladding surface becomes obvious. In the case of an ordinary single-mode fiber, as an empirical rule, an increase in the microbending loss becomes predominant compared with the bending loss when the radius of curvature becomes 10 mm or smaller.

Accordingly, the loss adjustment bobbin 23 of the present embodiment has a structure as shown in FIGS. 1A to 2 and positively utilizes the characteristics of a single-mode fiber with a radius of curvature of 11 to 15 mm, which produces a loss without causing any problem about quality and is capable of easily providing a required amount of loss.

2. Second Embodiment

In the case of applying the present invention to an optical multiplexer/demultiplexer for wavelength division multiplexing (WDM) transmission, since there are a very large number of places where loss adjustment should be carried out, it is impractical, in view of the efficiency of implementation, to individually apply the structure of the first embodiment to each optical fiber. Therefore, according to a second embodiment, a structure is made such that a plurality of optical fibers can be wound in a stacked manner in the height direction, with an insulator interposed between each optical fiber.

Figure 5:
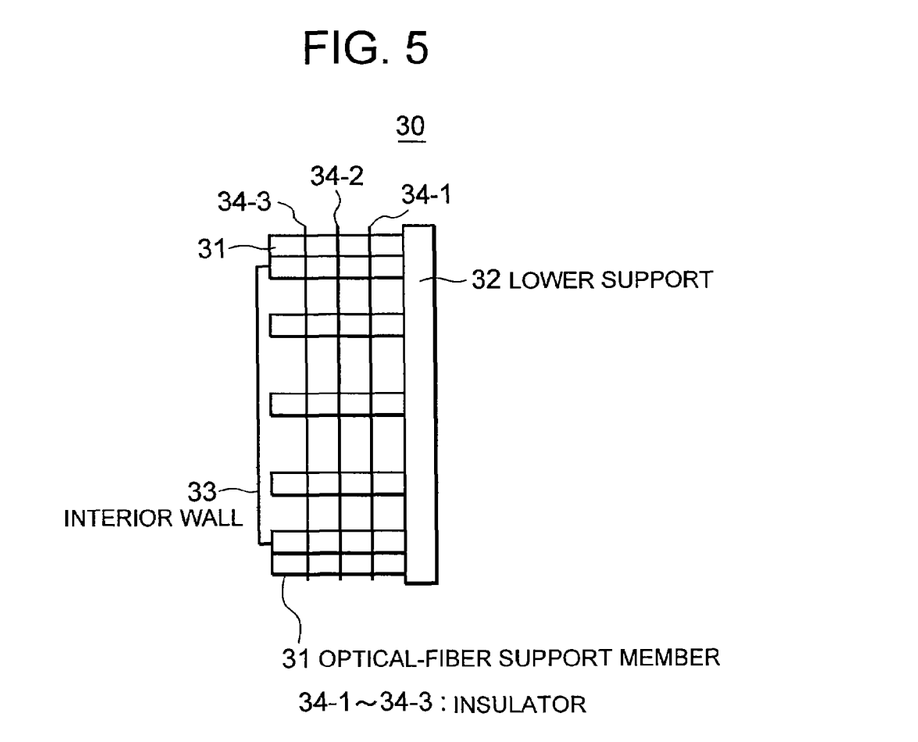
FIG. 5 is a side view of an optical-fiber loss adjustor according to a second embodiment of the present invention.
Figure 6:
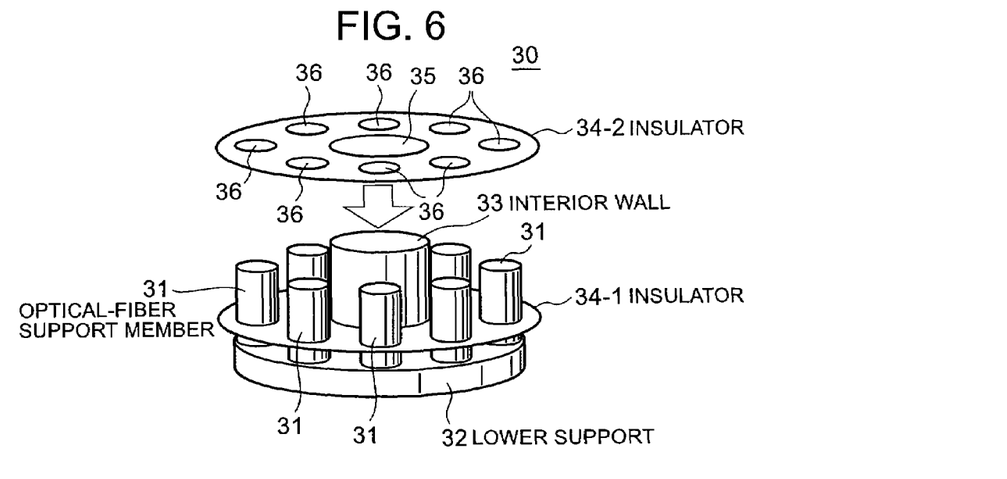
FIG. 6 is a perspective view of the optical-fiber loss adjustor according to the second embodiment of the present invention.

Referring to FIGS. 5 and 6, in an optical-fiber loss adjustor according to the second embodiment of the present invention, the height of each optical-fiber support member 31 is set as large as a plurality of optical fibers can be stacked and each wound around a circle composed of a plurality of optical-fiber support members 31. Except this point, the second embodiment is similar to the first embodiment in the respects that a cylindrical interior wall 33 is provided in the center of a disk-shaped lower support 32 and that a plurality of the cylindrical optical-fiber support members 31 are arranged and fixed in a circle on the outside of (around) the interior wall 33.

With this structure, a first optical fiber is wound along a space between the optical-fiber support members 31 and the interior wall 33, and then an insulator 34-1 is placed on the first optical fiber. As shown in FIG. 6, each insulator such as the insulator 34-1 has a disk-like shape, is perforated in the center with a penetrating hole 35 through which the interior wall 33 is passed, and is perforated, in a circle surrounding the penetrating hole 35, with penetrating holes 36 through which the plurality of optical-fiber support members 31 are respectively passed. With this structure, the insulator 34-1 is fixedly placed, with the interior wall 33 and optical-fiber support members 31 piercing through it, as shown in FIGS. 5 and 6.

Subsequently, above this insulator 34-1, a second optical fiber is wound along the space between the optical-fiber support members 31 and the interior wall 33, and then an insulator 34-2 is similarly placed on the second optical fiber in a pierced manner. Thereafter, similar operations are repeated to wind a required number of optical fibers. When it is finished, a disk-shaped upper support (not shown) is placed and fixed onto the top of the resulting structure. Although three insulators 34-1 to 34-3 are provided in FIG. 5, FIG. 6 shows a state where the second insulator 34-2 is being placed. The application of the present embodiment can enhance the efficiency of implementation. In addition to this, the forms of the optical fibers are completely fixed. Therefore, the present embodiment can be said to be a structure more suitable for mass production.

3. Third Embodiment

A third embodiment of the present invention is a structure in which a bobbin for optical fiber accommodation and loss adjusting means according to the present invention are integrated. This structure can provide space savings.

Figure 7:
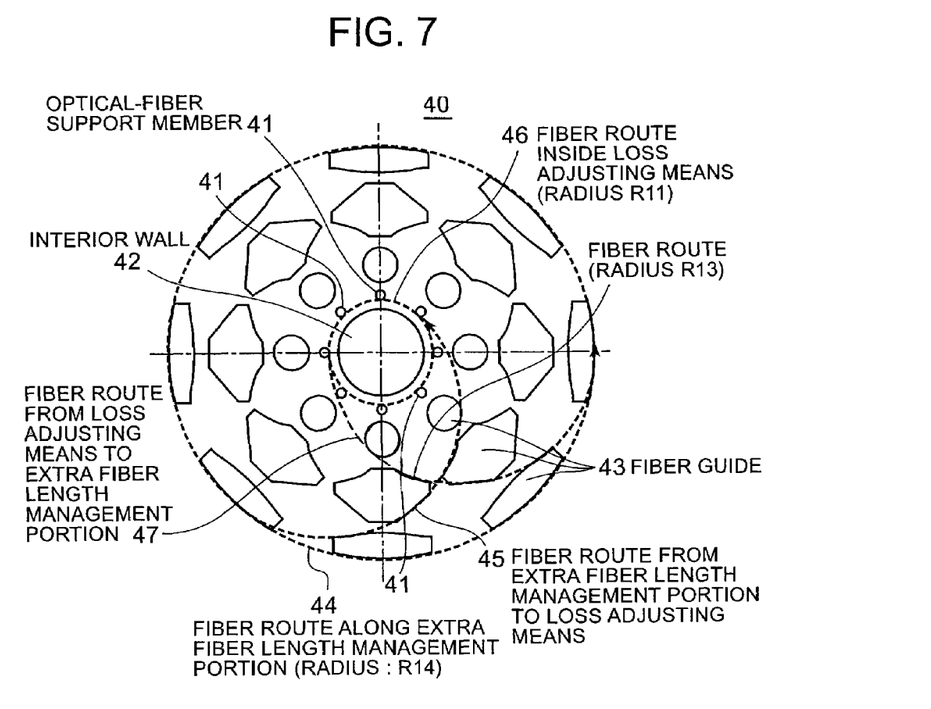
FIG. 7 is a plane view of an optical-fiber loss adjustor according to a third embodiment of the present invention.

Referring to FIG. 7, an optical-fiber loss adjustor 40 according to the third embodiment, provided with loss adjusting means and an extra fiber length management portion, is structured as follows. Specifically, as the loss adjusting means, a cylindrical interior wall 42 is disposed and fixed onto a lower support, and a plurality of cylindrical optical-fiber support members 41 with a small diameter are concentrically disposed so as to surround the interior wall 42. The extra fiber length management portion in a cylindrical shape is provided at the outmost periphery. Fiber guides 43 are appropriately arranged around the optical-fiber support members 41 so that an optical fiber can be smoothly routed between these concentrically disposed loss adjusting means and extra fiber length management portion. The loss adjusting means corresponds to the bobbin 23 for loss adjustment shown in FIG. 4, and the extra fiber length management portion corresponds to the bobbin 24 for extra fiber length management shown in FIG. 4.

In the present embodiment, an optical fiber from an optical component is looped along a fiber route shown at reference numeral 44 in FIG. 7, along the extra fiber length management portion with a radius R14, whereby extra fiber length management is appropriately carried out. Thereafter, the optical fiber is passed along a route 45 from the extra fiber length management portion to the loss adjusting means and is led into the loss adjusting means, in which the optical fiber is wound round with a small radius R11 between the interior wall 42 and the optical-fiber support members 41, whereby an appropriate loss is produced. In FIG. 7, this optical fiber route with the radius R11 inside the loss adjusting means is shown at reference numeral 46. Thereafter, the optical fiber is passed along a route 47 in FIG. 7 and is led from the loss adjusting means to the extra fiber length management portion again, where required extra fiber length management is carried out.

In a conventional optical apparatus, extra fiber length management is inevitably required. The use of the optical-fiber loss adjustor according to the present embodiment makes it possible to add the loss adjusting means without making a change in a conventional footprint.

Here, when R13 is the radius of an optical fiber route leading between the two blocks, i.e., between the loss adjusting means and the extra fiber length management portion as shown in FIG. 7, and R14 is the radius of the route along the extra fiber length management portion, then the relationship of these radii with the radius R11 in FIG. 7, which corresponds to R1 in FIG. 2, can be represented by the following equation:

$$R14 = 2*R13 - R11 \qquad (2)$$

where R14<25 mm, and 11 mm<R11<15 mm.

Supposing that R14=25 mm, solving the equation (2) gives 18 mm<R13<20 mm. A loss produced when R14=24 mm is no problem, with a value of 0.05 dB or smaller, which is not greater than one twentieths of a loss produced when R=15 mm in FIG. 3.

As described above, according to the present embodiment, in an adjustment of an optical-fiber loss to an arbitrary value, if the above-mentioned equation (2) is satisfied, the optical fiber can be routed from an arbitrary position among the plurality of optical-fiber support members 41, constituting the loss adjusting means, to the cylindrical extra fiber length management portion with the radius R14.

Incidentally, although only the two routes 45 and 47 are shown as fiber routes leading between the two blocks, i.e., between the loss adjusting means and the extra fiber length management portion, in the present embodiment, it is obvious that there are as many fiber routes leading in/out as the number of the optical-fiber support members on condition that the equation (2) is satisfied.

Note that the present invention is not limited to the above-described embodiments. For example, the shapes of the fiber guides in FIG. 7 may be another one as long as it can guide an optical fiber between the two blocks, with the radii of curvature of the optical fiber kept constant. Accordingly, any shape and arrangement (intervals) will suffice as long as an optical fiber can be guided, with the radius R14 of the fiber route 44 along the extra fiber length management section and the radius R13 of the fiber route 47 from the loss adjusting means to the extra fiber length management section both satisfying the equation (2). With the radii R14 and R13, since a microbending loss is as small as is negligible, the shape of a fiber guide 43 may be a cylindrical shape similar to that of the optical-fiber support members, and is not particularly limited as long as it is aimed at achieving the above-mentioned object.

Further, it is also possible to apply the first embodiment to the part of the loss adjusting means in the third embodiment. Furthermore, it is also possible to make the structure of the third embodiment such that a plurality of optical fibers can be wound in a stacked manner in the height direction with an insulator interposed between each optical fiber, as the second embodiment.

In addition, the order of connecting the bobbins and the like between the input connector 21 and the output connector 25 in FIG. 4 is not limited to the order shown in FIG. 4.

The invention claimed is:

1. A method for adjusting an intensity level of an optical signal transmitted through an optical fiber, comprising:

providing a cylindrical interior wall and a plurality of cylindrical optical-fiber support members which are concentrically disposed, wherein each of the cylindrical optical-fiber support members has a diameter smaller than that of the cylindrical interior wall; and adjusting an intensity level of an optical signal by winding a number of turns of the optical fiber between the cylindrical interior wall and the plurality of cylindrical optical-fiber support members, wherein the number of turns corresponds to a desired amount of adjustment wherein a radius of each of the plurality of cylindrical optical-fiber support members is set within a range satisfying the following inequality:

$$R2(1+\cos\theta) - d < R1(1-\cos\theta),$$

wherein R1 is a radius of a maximum turn of the optical fiber wound between the cylindrical interior wall and the plurality of cylindrical optical-fiber support members, R2 (<R1) is the radius of each of the plurality of cylindrical optical-fiber support members, and $\theta$ is an arrangement interval (angle) between adjacent ones of the plurality of cylindrical optical-fiber support members.

2. A method for adjusting an intensity level of an optical signal transmitted through an optical fiber, comprising:

providing a cylindrical interior wall and a plurality of cylindrical optical-fiber support members on a lower support, wherein the cylindrical interior wall and the cylindrical optical-fiber support members are concentrically disposed, wherein each of the cylindrical optical-fiber support members has a diameter which is smaller than a diameter of the cylindrical interior wall;

winding a first number of turns of a first optical fiber between the cylindrical interior wall and the plurality of cylindrical optical-fiber support members, wherein the first number of turns corresponds to a first amount of adjustment;

disposing a first insulator on the first optical fiber wound, wherein the first insulator is perforated with penetrating holes through which the cylindrical interior wall and the plurality of cylindrical optical-fiber support members each are passed; and winding an i-th (i is a natural number greater than 1) number of turns of an i-th optical fiber between the cylindrical interior wall and the plurality of cylindrical optical-fiber support members protruding from the first insulator, wherein the i-th number of turns corresponds to an i-th amount of adjustment, wherein, when winding a (i+1)-th optical fiber, the method farther comprising:

disposing an i-th insulator on the i-th optical fiber wound, wherein the i-th insulator is perforated with penetrating holes through which the cylindrical interior wall and the plurality of cylindrical optical-fiber support members each are passed; and winding a (i+1)-th number of turns of the i-th optical fiber between the cylindrical interior wall and the plurality of cylindrical optical-fiber support members protruding from the i-th insulator, wherein the (i+1)-th number of turns corresponds to a (i+1)-th amount of adjustment, wherein a radius of each of the plurality of cylindrical optical-fiber support members is set within a range satisfying the following inequality:

$$R2(1+\cos\theta)-d<R1(1-\cos\theta),$$

wherein R1 is a radius of a maximum turn of the optical fiber wound between the cylindrical interior wall and the plurality of cylindrical optical-fiber support members, R2 (<R1) is the radius of each of the plurality of cylindrical optical-fiber support members, and θ is an arrangement interval (angle) between adjacent ones of the plurality of cylindrical optical-fiber support members.

3. A method for adjusting an intensity level of an optical signal transmitted through an optical fiber, comprising:

preparing an extra fiber length management section and a loss adjustment section provided within the extra fiber length management section, wherein the optical fiber is wound on the extra fiber length management section for extra fiber length management, wherein the loss adjustment section includes a cylindrical interior wall and a plurality of cylindrical optical-fiber support members which are concentrically disposed, wherein each of the cylindrical optical-fiber support members has a diameter smaller than that of the cylindrical interior wall;

passing the optical fiber from the extra fiber length management section to the loss adjustment section to adjust an intensity level of an optical signal by winding a number of turns of the optical fiber between the cylindrical interior wall and the plurality of cylindrical optical-fiber support members, wherein the number of turns corresponds to a desired amount of adjustment; and passing the optical fiber from the loss adjustment section to the extra fiber length management section to perform extra fiber length management, wherein a radius of each of the plurality of cylindrical optical-fiber support members is set within a range satisfying the following inequality:

$$R2(1+\cos 0)-d<R1(1-\cos\theta)$$

where R1 is a radius of a maximum turn of the optical fiber wound between the cylindrical interior wall and the plurality of cylindrical optical-fiber support members, R2 (<R1) is the radius of each of the plurality of cylindrical optical-fiber support members, and θ is an arrangement interval (angle) between adjacent ones of the plurality of cylindrical optical-fiber support members.

4. An apparatus for adjusting an intensity level of an optical signal transmitted through an optical fiber, comprising:

a lower support shaped like a disk;

a cylindrical interior wall provided at a center on a top surface of the lower support; and a plurality of cylindrical optical-fiber support members which are concentrically disposed around the cylindrical interior wall, wherein each of the cylindrical optical-fiber support members has a diameter smaller than that of the cylindrical interior wall, wherein an intensity level of an optical signal is adjusted by winding a number of turns of the optical fiber between the cylindrical interior wall and the plurality of cylindrical optical-fiber support members, wherein the number of turns corresponds to a desired amount of adjustment, wherein a radius of each of the plurality of cylindrical optical-fiber support members is set within a range satisfying the following inequality:

$$R2(1+\cos\theta)-d<R1(1-\cos\theta),$$

wherein R1 is a radius of a maximum turn of the optical fiber wound between the cylindrical interior wall and the plurality of cylindrical optical-fiber support members, R2 (<R1) is the radius of each of the plurality of cylindrical optical-fiber support members, and θ is an arrangement interval (angle) between adjacent ones of the plurality of cylindrical optical-fiber support members.

5. The apparatus according to claim 4, wherein a length of the cylindrical interior wall is set larger than that of the cylindrical optical-fiber support members and is provided with a upper support shaped like a disk on a top of the cylindrical interior wall, to form an optical-fiber insertion opening through which the optical fiber is allowed to be inserted.

6. An apparatus for adjusting an intensity level of an optical signal transmitted through an optical fiber, comprising:

a lower support shaped like a disk;

a cylindrical interior wall provided at a center on a top surface of the lower support;

a plurality of cylindrical optical-fiber support members which are concentrically disposed around the cylindrical interior wall, wherein each of the cylindrical optical-fiber support members has a diameter smaller than that of the cylindrical interior wall;

at least one insulator stacked in a height direction, wherein each insulator is perforated with penetrating holes through which the cylindrical interior wall and the plurality of cylindrical optical-fiber support members each are passed; and a plurality of optical fibers, each of which is wound between the cylindrical interior wall and the plurality of cylindrical optical-fiber support members a corresponding number of turns on a different insulator, wherein the corresponding number of turns corresponds to a desired amount of adjustment for the optical fiber, wherein a radius of each of the plurality of cylindrical optical-fiber support members is set within a range satisfying the following inequality:

$$R2(1+\cos\theta)-d<R1(1-\cos\theta),$$

wherein R1 is a radius of a maximum turn of the optical fiber wound between the cylindrical interior wall and the plurality of cylindrical optical-fiber support members, R2 (<R1) is the radius of each of the plurality of cylindrical optical-fiber support members, and θ is an arrangement interval (angle) between adjacent ones of the plurality of cylindrical optical-fiber support members.

7. An apparatus for adjusting an intensity level of an optical signal transmitted through an optical fiber, comprising:

an extra fiber length management section for managing an extra fiber length of the optical fiber by winding the optical fiber on the extra fiber length management section;

a loss adjustment section comprising:

a cylindrical interior wall provided at a center within the extra fiber length management section; and a plurality of cylindrical optical-fiber support members which are concentrically disposed around the cylindrical interior wall within the extra fiber length management section, wherein each of the cylindrical optical-fiber support members has a diameter smaller than that of the cylindrical interior wall; and a fiber guide section for guiding the optical fiber from the extra fiber length management section to a space between the cylindrical interior wall and the plurality of cylindrical optical-fiber support members, and vice versa, wherein a radius of each of the plurality of cylindrical optical-fiber support members is set within a range satisfying the following inequality:

$$R2(1+\cos\theta)-d<R1(1-\cos\theta),$$

wherein R1 is a radius of a maximum turn of the optical fiber wound between the cylindrical interior wall and the plurality of cylindrical optical-fiber support members, R2 (<R1) is the radius of each of the plurality of cylindrical optical-fiber support members, and θ is an arrangement interval (angle) between adjacent ones of the plurality of cylindrical optical-fiber support members.

8. An optical transmission system having an input connector and an output connector, comprising:

at lease one optical device provided on an optical fiber through which an optical signal is transmitted from the input connector to the output connector;

an optical loss adjustment bobbin provided on an optical fiber, wherein the optical loss adjustment bobbin comprises:

a lower support shaped like a disk;

a cylindrical interior wall provided at a center on a top surface of the lower support; and a plurality of cylindrical optical-fiber support members which are concentrically disposed around the cylindrical interior wall, wherein each of the cylindrical optical-fiber support members has a diameter smaller than that of the cylindrical interior wall, wherein an intensity level of the optical signal is adjusted by winding a number of turns of the optical fiber between the cylindrical interior wall and the plurality of cylindrical optical-fiber support members, wherein the number of turns corresponds to a desired amount of adjustment, wherein a radius of each of the plurality of cylindrical optical-fiber support members is set within a range satisfying the following inequality:

$$R2(1+\cos\theta)-d<R1(1-\cos\theta),$$

wherein R1 is a radius of a maximum turn of the optical fiber wound between the cylindrical interior wall and the plurality of cylindrical optical-fiber support members, R2 (<R1) is the radius of each of the plurality of cylindrical optical-fiber support members, and θ is an arrangement interval (angle) between adjacent ones of the plurality of cylindrical optical-fiber support members.

9. The optical transmission system according to claim 8, wherein a length of the cylindrical interior wall is set larger than that of the cylindrical optical-fiber support members and is provided with a upper support shaped like a disk on a top of the cylindrical interior wall, to form an optical-fiber insertion opening through which the optical fiber is allowed to be inserted.

10. An optical transmission system having an input connector and an output connector for each of a plurality of optical fibers, comprising:

at lease one optical device provided on a corresponding optical fiber through which an optical signal is transmitted from the input connector to the output connector;

an optical loss adjustment bobbin provided on the corresponding optical fiber, wherein the optical loss adjustment bobbin comprises:

a lower support shaped like a disk;

a cylindrical interior wall provided at a center on a top surface of the lower support;

a plurality of cylindrical optical-fiber support members which are concentrically disposed around the cylindrical interior wall, wherein each of the cylindrical optical-fiber support members has a diameter smaller than that of the cylindrical interior wall; and at least one insulator stacked in a height direction, wherein each insulator is perforated with penetrating holes through which the cylindrical interior wall and the plurality of cylindrical optical-fiber support members each are passed, wherein each of the plurality of optical fibers is wound between the cylindrical interior wall and the plurality of cylindrical optical-fiber support members a corresponding number of turns on a different insulator, wherein the corresponding number of turns corresponds to a desired amount of adjustment for the corresponding optical fiber, and wherein a radius of each of the plurality of cylindrical optical-fiber support members is set within a range satisfying the following inequality:

$$R2(1+\cos\theta)-d<R1(1-\cos\theta),$$

wherein R1 is a radius of a maximum turn of the optical fiber wound between the cylindrical interior wall and the plurality of cylindrical optical-fiber support members, R2 (<R1) is the radius of each of the plurality of cylindrical optical-fiber support members, and θ is an arrangement interval (angle) between adjacent ones of the plurality of cylindrical optical-fiber support members.

11. An optical transmission system having an input connector and an output connector, comprising:

at lease one optical device provided on an optical fiber through which an optical signal is transmitted from the input connector to the output connector;

an extra fiber length management section for managing an extra fiber length of the optical fiber by winding the optical fiber on the extra fiber length management section;

a loss adjustment section comprising:

a cylindrical interior wall provided at a center within the extra fiber length management section; and a plurality of cylindrical optical-fiber support members which are concentrically disposed around the cylindrical interior wall within the extra fiber length management section, wherein each of the cylindrical optical-fiber support members has a diameter smaller than that of the cylindrical interior wall; and a fiber guide section for guiding the optical fiber from the extra fiber length management section to a space between the cylindrical interior wall and the plurality of cylindrical optical-fiber support members, and vice versa, wherein the extra fiber length management section, the loss adjustment section, and the fiber guide section are combined in one unit, wherein a radius of each of the plurality of cylindrical optical-fiber support members is set within a range satisfying the following inequality:

$R2(1+\cos \theta)-d<R1(1-\cos \theta)$, wherein R1 is a radius of a maximum turn of the optical fiber wound between the cylindrical interior wall and the plurality of cylindrical optical-fiber support members, R2 (<R1) is the radius of each of the plurality of cylindrical optical-fiber support members, and θ is an arrangement interval (angle) between adjacent ones of the plurality of cylindrical optical-fiber support members.

12. An apparatus for adjusting an intensity level of an optical signal transmitted through an optical fiber by using a curvature loss of the optical fiber, comprising:

a cylindrical inner support member provided on a lower support; and a plurality of outer support members which are concentrically disposed around the cylindrical inner support member on the lower support, wherein an intensity level of an optical signal is adjusted by winding the optical fiber between the cylindrical inner support member and an innermost circle of the outer support members, wherein a radius of each of the plurality of cylindrical optical-fiber support members is set within a range satisfying the following inequality:

$R2(1+\cos \theta)-d<R1(1-\cos \theta)$, wherein R1 is a radius of a maximum turn of the optical fiber wound between the cylindrical interior wall and the plurality of cylindrical optical-fiber support members, R2 (<R1) is the radius of each of the plurality of cylindrical optical-fiber support members, and θ is an arrangement interval (angle) between adjacent ones of the plurality of cylindrical optical-fiber support members.

13. The apparatus according to claim 12, wherein an outermost circle of the outer support members is provided for managing an extra fiber length of the optical fiber.

14. The apparatus according to claim 13, wherein a plurality of outer support members between the innermost circle and the outermost circle of the outer support members is provided for guiding the optical fiber from the outermost circle to the innermost circle and vice versa.

15. The apparatus according to claim 12, wherein at least one optical fiber is stacked on the optical fiber with an insulator inserted between adjacent optical fibers in a height direction of the cylindrical inner support member and the plurality of outer support members.

16. The apparatus according to claim 12, wherein a length of the cylindrical inner support member is set larger than that of the plurality of outer support members and is provided with a upper support shaped like a disk on a top of the cylindrical inner support member, to form an optical-fiber insertion opening through which the optical fiber is allowed to be inserted.

* * * * *